Sept. 7, 1926.                                            1,598,796
R. M. WILLIAMS
APPARATUS FOR TESTING THE BALANCE OF CONNECTING RODS
Filed June 16, 1923
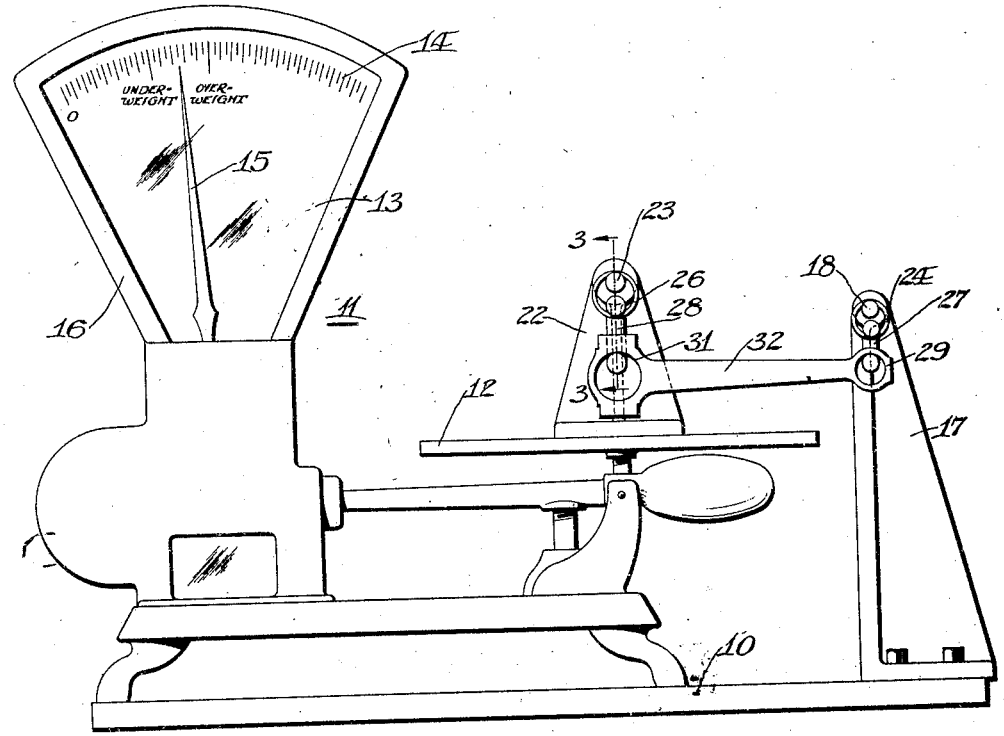
Fig. 1
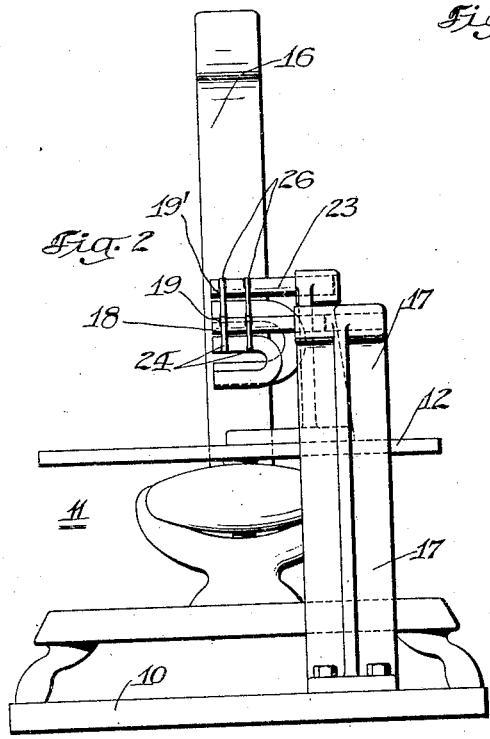
Fig. 2
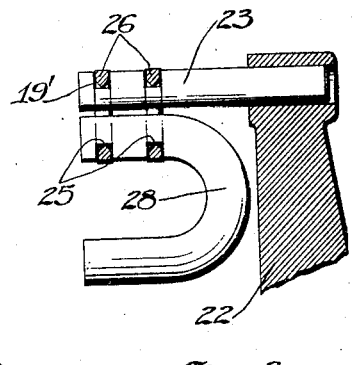
Fig. 3
Fig. 4
Inventor
Ralph M. Williams
By Milton Tibbetts
Attorney

Patented Sept. 7, 1926.

1,598,796

UNITED STATES PATENT OFFICE.

RALPH M. WILLIAMS, OF DETROIT, MICHIGAN, ASSIGNOR TO PACKARD MOTOR CAR COMPANY, OF DETROIT, MICHIGAN, A CORPORATION OF MICHIGAN.

APPARATUS FOR TESTING THE BALANCE OF CONNECTING RODS.

Application filed June 16, 1923. Serial No. 645,715.

This invention relates to internal combustion engines, particularly to the connecting rods thereof, and it has for an object to provide a method and apparatus by which such connecting rods may be quickly and easily matched in sets for use in such engines.

Another object of the invention is to provide a single device by which connecting rods may be matched for characteristics of both weight and center of gravity.

Other objects and structural details of the invention will appear from the following description taken in connection with the drawings, which form a part of this specification, and in which:

Fig. 1 is a side elevation of a device embodying the invention;

Fig. 2 is an end elevation of the device shown in Fig. 1;

Fig. 3 is an enlarged detail section, substantially on the line 3—3 of Fig. 1, showing the connecting rod suspension means, and Fig. 4 is a cross section through one of the suspension rings.

It is highly desirable in the construction and operation of internal combustion engines to eliminate as much as possible the stresses and vibration caused by a lack of balance of the moving parts, and with this end in view it has been the practice of manufacturers of such engines to balance the crank shafts thereof, and as far as practicable the connecting rods associated with the crankshafts. Such a condition of balance assumes that the connecting rods employed in any given engine have been substantially the same weight and that their centers of gravity are located at substantially the same distance from the axes of their crank shaft bearings.

The average run of connecting rods manufactured by modern production methods are found, however, to vary considerably from any given standard, and various schemes have been proposed for matching up sets of such rods in which the individual rods of each set would have substantially the same weight and center of gravity characteristics.

Such procedure has heretofore involved the matching of successive rods against a master rod, or against one arbitrarily selected, until enough rods were found within the permissible percentage of variation from the rod selected to complete a set. Furthermore, the apparatus used in the various weighing operations has frequently been of a character to seriously impair the sensitiveness of the operation, and this has been particularly true in the determination of the center of gravity characteristic.

By this invention is provided a method of quickly and accurately matching sets of connecting rods within any desired limits of permissible variation. It also provides apparatus adapted for the efficient and economical practice of the method.

Referring to the drawing, at 10 is indicated a base plate, to which is secured an ordinary platform scale 11, having the usual load receiving platform 12 adapted to operate indicating mechanism 13, including a graduated dial 14 and a pointer 15, as clearly shown in Fig. 1. The indicating mechanism is preferably housed in a suitable casing 16.

Spaced from the platform 12 is a standard 17, rigidly attached to the base plate 10 in any convenient manner. Projecting from the upper end of the standard 17 is a transverse bracket member 18, the upper side of which is provided with guide notches or grooves 19.

Secured to the platform 12 of the scale 11 is a similar standard 22 provided with a projecting bracket member 23, notched or grooved at 19' in a manner similar to the bracket member 18. The grooves in the bracket members 18 and 23 are adapted for cooperation with pairs of suspension rings 24 and 26, formed to provide inwardly disposed knife edges 25, which bear in the grooves on the bracket members. Suspended from the rings 24 and 26 are U-shaped arbors 27 and 28, the upper limbs of which rest on the knife edges 25. The lower limbs of the arbors 27 and 28 are adapted to support the small or piston pin end 29, and the large or crank shaft end 31 of a connecting rod 32, respectively.

The dial 14 is preferably graduated into suitable units, such as ounces and fractions thereof, and may also be provided with suitable limit marks, indicating the permissible variation above and below the specified connecting rod weight.

In the practice of this method, the workman determines both the total weight and the weight of the crank shaft end of each connecting rod on the same device. A given connecting rod 32 is taken from the manufactured stock to be tested and placed on the platform 12 of the scale 11, and the reading of the pointer 16 noted. This reading is, of course, the total weight of the rod, and should lie within the permissible variation from the standard weight specified. The rod 32 is then removed from the platform 12 and placed on the arbors 27 and 28, and the second reading of the pointer 16 noted. This second reading is the weight of the crank shaft end of the connecting rod, which is an index of the position of the center of gravity thereof. These readings are taken in succession on each of the rods constituting the stock to be tested. If desired, the weight of the crank shaft end of the rod may be determined before the total weight thereof.

As fast as these readings are taken, the successive rods are placed in groups in any convenient place, such as suitable bins, according to the respective readings of the pointer 16. Thus each such group will contain only rods which have substantially the same weight and center of gravity characteristics. When any group contains a number of rods equal to the number of cylinders in the engine for which they are being manufactured, the set is complete, and the rods may be removed for installation. For example, in the manufacture of a four cylinder engine, any given group would contain a complete set when there were four rods therein.

It will be obvious that the method of support of the connecting rods 32 on the arbors 27 and 28, which in turn depend from the knife edges 25 of the rings 24 and 26, insures that the rod is allowed to freely assume its natural position of suspension, so that errors in the scale reading due to constraint of the rod are negligible.

It will also be seen that this invention provides a method by which sets of connecting rods may be very rapidly assembled. It is not necessary to match any given rod against any other rod, or against any standard data, as long as it comes within the limits specified, which is determined simultaneously with the weight. The operator simply weighs up the rods as rapidly as he can place them on the device, removes them and puts them in their proper groups.

It will be understood that various forms of the invention other than those described above may be used without departing from the spirit or scope of the invention.

What is claimed is:

1. The combination in a device for determining the weight data of connecting rods of internal combustion engines, of a base plate, a platform scale thereon, standards secured to the platform and to the base plate, arbors adapted to cooperate with the ends of the connecting rod, and means including knife edges adapted to suspend the arbors from the standards.

2. The combination in a device for weighing connecting rods, of a platform scale mounted on a base plate, standards secured to the platform and to the base plate respectively, brackets projecting from the standards, rings suspended from the brackets and provided with knife edges, and U-shaped mandrels adapted to support the connecting rod and carried by said knife edges.

3. The combination in a device for weighing the connecting rods of internal combustion engines, of a scale, a standard supported thereon, a stationary standard in spaced relation thereto, U-shaped arbors each having a leg adapted for cooperation with the ends of a connecting rod and means for freely suspending said arbors from the standards.

4. The combination in a device for weighing connecting rods of a base plate, a platform secured thereon, a standard secured to the plate having a projecting arm, a standard on the base plate spaced from said platform standard and having a similar arm, arbors adapted to co-operate with the ends of the connecting rod, and members having knife edges to freely suspend the arbors and connecting rod from said arms.

In testimony whereof I affix my signature.

RALPH M. WILLIAMS.